(12) United States Patent
Hell et al.

(10) Patent No.: US 11,009,428 B2
(45) Date of Patent: May 18, 2021

(54) SUB-ASSEMBLY FOR A DRIVE UNIT, DRIVE UNIT, DRIVE TRAIN TEST STAND, AND MODULAR SYSTEM

(71) Applicant: ZF Friedrichshafen AG, Friedrichshafen (DE)

(72) Inventors: Christian Hell, Untergriesbach (DE); Bernhard Pauli, Ringelai (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 309 days.

(21) Appl. No.: 16/074,158

(22) PCT Filed: Jan. 16, 2017

(86) PCT No.: PCT/EP2017/050747
§ 371 (c)(1),
(2) Date: Jul. 31, 2018

(87) PCT Pub. No.: WO2017/140442
PCT Pub. Date: Aug. 24, 2017

(65) Prior Publication Data
US 2019/0331554 A1    Oct. 31, 2019

(30) Foreign Application Priority Data
Feb. 16, 2016  (DE) ..................... 10 2016 202 334.9

(51) Int. Cl.
*G01M 15/02*    (2006.01)
*G01M 17/007*   (2006.01)
*F16H 57/025*   (2012.01)

(52) U.S. Cl.
CPC ........ *G01M 17/007* (2013.01); *F16H 57/025* (2013.01)

(58) Field of Classification Search
CPC ...... G01M 15/02; G01M 15/04; G01M 17/00; G01M 17/007
(Continued)

(56) References Cited

U.S. PATENT DOCUMENTS 4,511,112 A * 4/1985 Ruehle ..................... F16M 5/00
                                                    248/544
4,592,228 A * 6/1986 Lucia .................. G01M 13/025
                                                    73/115.02
(Continued)

FOREIGN PATENT DOCUMENTS

DE    13 28 537 A1    3/1995
DE    198 22 093 A1   11/1999
(Continued)

OTHER PUBLICATIONS

German Search Report Corresponding to 10 2016 202 334.9 dated Sep. 27, 2016.
(Continued)

*Primary Examiner* — Eric S. McCall
(74) *Attorney, Agent, or Firm* — Finch & Maloney, PLLC; Michael J. Bujold

(57) ABSTRACT

A sub-assembly (2, 3, 4, 5, 6, 7) for a drive unit (1). The sub-assembly (2, 3, 4, 5, 6, 7), according to the invention, is characterized in that the sub-assembly (2, 3, 4, 5, 6, 7) comprises a standardized interface for connection to a further sub-assembly (2, 3, 4, 5, 6, 7) for the same drive unit (1). The invention also relates to a corresponding drive unit (1), a corresponding drive-train test stand (20) and a corresponding modular system.

13 Claims, 7 Drawing Sheets

(58) Field of Classification Search
USPC .............. 73/115.01, 116.01, 116.02, 116.03,
73/116.05, 117.01, 117.02, 117.03,
73/118.01
See application file for complete search history.

(56) References Cited

U.S. PATENT DOCUMENTS

| | | | |
|---|---|---|---|
| 4,932,628 | A | 6/1990 | Pacheco |
| 6,393,904 | B1 | 5/2002 | Krug et al. |
| 6,698,293 | B2 | 3/2004 | Reinisch et al. |
| 7,066,040 | B2 | 6/2006 | Brüggemann et al. |
| 2010/0107749 | A1* | 5/2010 | Gushman .............. G01M 15/02 73/116.02 |
| 2011/0308307 | A1* | 12/2011 | Schneider ........... G01M 13/027 73/114.26 |
| 2019/0204185 | A1* | 7/2019 | Bosl ................... G01M 17/022 |

FOREIGN PATENT DOCUMENTS

| | | |
|---|---|---|
| DE | 100 37 412 A1 | 3/2002 |
| DE | 101 35 976 A1 | 2/2003 |
| DE | 102 34 022 A1 | 2/2004 |
| DE | 103 44 802 A1 | 4/2005 |
| DE | 10 2008 006 634 A1 | 7/2009 |
| DE | 10 2012 018 359 A1 | 3/2013 |

OTHER PUBLICATIONS

International Search Report Corresponding to PCT/EP2017/050747 dated May 8, 2017.
Written Opinion Corresponding to PCT/EP2017/050747 dated May 8, 2017.

* cited by examiner

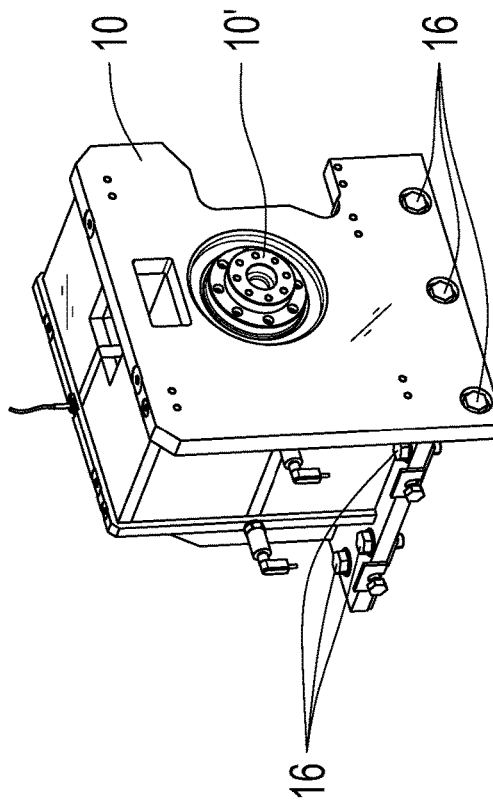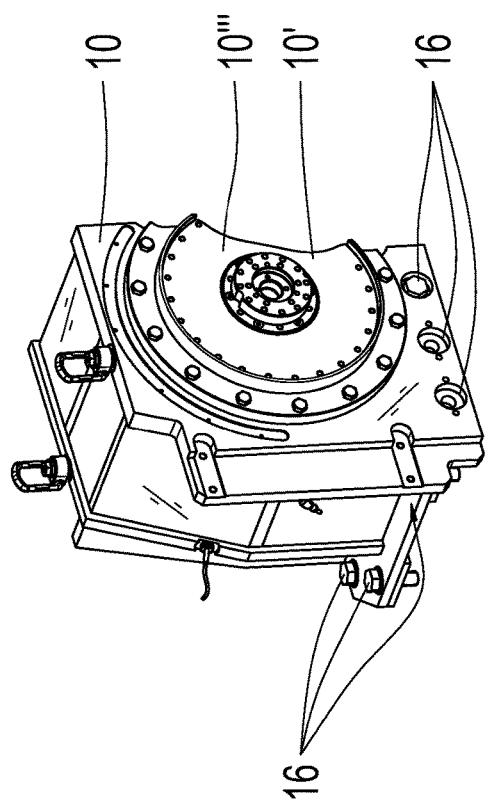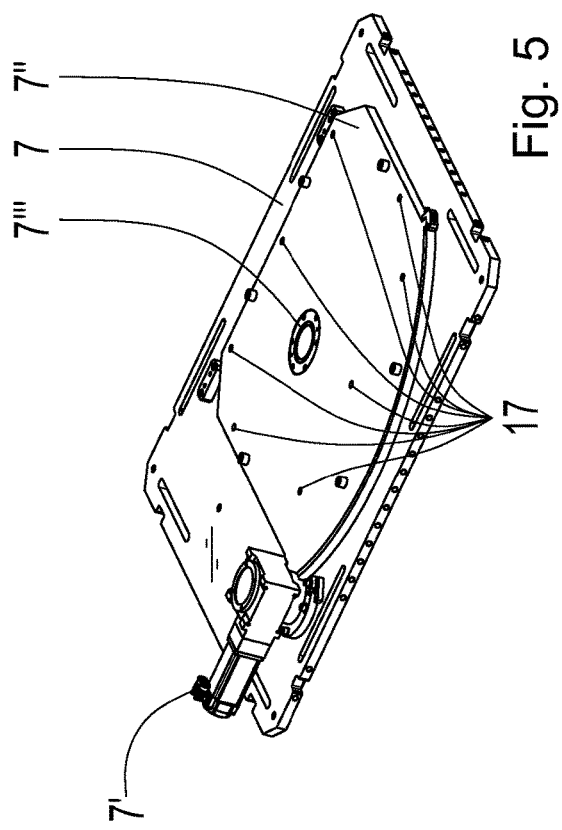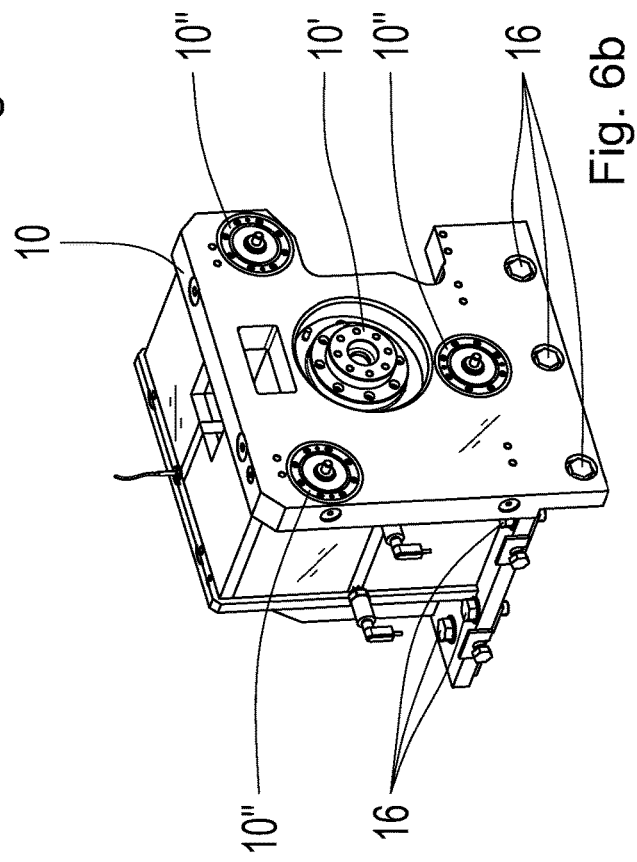
Fig. 5
Fig. 6a
Fig. 6b
Fig. 6c

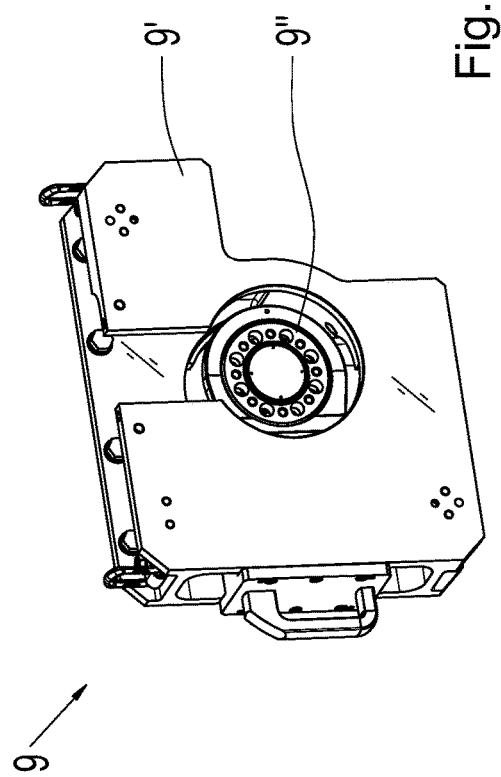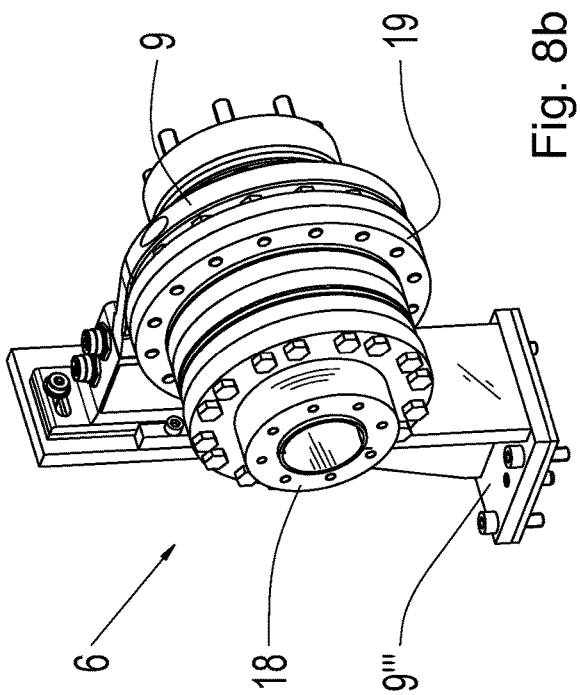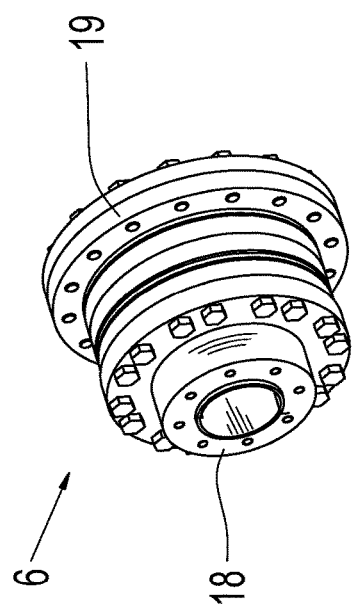

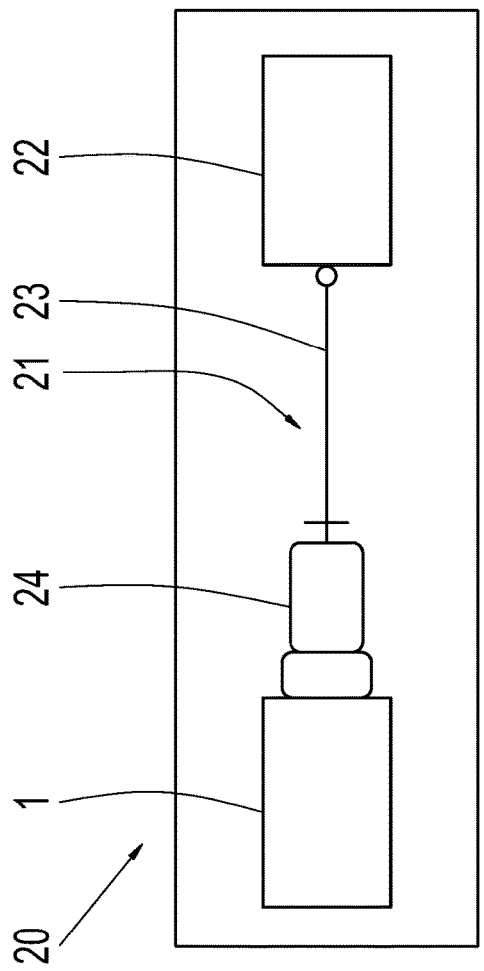

SUB-ASSEMBLY FOR A DRIVE UNIT, DRIVE UNIT, DRIVE TRAIN TEST STAND, AND MODULAR SYSTEM

This application is a National Stage completion of PCT/EP2017/050747 filed Jan. 16, 2017, which claims priority from German patent application serial no. 10 2016 202 334.9 filed Feb. 16, 2016.

FIELD OF THE INVENTION

The invention relates to a sub-assembly for a drive, a drive unit for a drive-train test stand, a drive-train test stand for testing a drive-train of a motor vehicle and a modular system.

BACKGROUND OF THE INVENTION

Transmission test stands or drive-train test stands, for testing motor vehicle transmissions or complete motor vehicle drive-trains, are known from the prior art. Such test stands are used, on the one hand, in order to recognize functional disorders in the drive-train, at an early stage, by virtue of a series of load tests. Typical functional disorders occur, for example, due to components affected by play, such as gearwheels, synchronizer rings, synchronizing bodies, disk clutch disks and shafts, which can be displaced or even excited into vibrations. As pad of the function examination the acoustic behavior and the shifting quality are usually tested. On the other hand, however, such test stands are also used during the development and continual improvement of motor vehicle drive-trains and, in particular, motor vehicle transmissions. In that context, special attention is usually paid to endurance strength and to the fundamental development of new technical operating principles.

In this connection, DE 10 2012 018 359 A1 describes a driving cycle for a driving simulation, which is undergone by a real motor vehicle on a rolling test stand. In this the drive-train, the motor vehicle works in such manner that the wheel rotation speed of the motor vehicle corresponds to the respective speed specifications of the driving cycle while the motor vehicle does not actually move off. This enables testing of the motor vehicle drive-train once it has been fitted into the motor vehicle.

DE 43 28 537 C2 discloses a transmission test stand with a first servomotor that acts as the drive motor and a second servomotor that acts as a braking motor. The first drive motor is connected by way of a clutch to the drive input shaft of a motor vehicle transmission to be tested, and its rotation speed is controlled by a PC, whereby any desired rotation speed variations can be simulated. The braking motor is connected by another clutch to a drive output of the motor vehicle transmission to be tested. The rotation speed of the second motor is also controlled by the PC. The rotation speed variations simulated by the PC are rotation speed variations measured during real driving tests. Thus, according to DE 43 28 537 C2, the motor vehicle drive-train can be tested even before being fitted into a motor vehicle.

However, the known drive-train test stands have disadvantages inasmuch as either they are not suitable for testing a motor vehicle drive-train before it has been fitted into a vehicle, or because, in relation to the design of their mechanical loading capacity and their dynamic behavior, they are designed specially and exclusively for a particular type of motor vehicle drive-train. Particularly the latter drive-train test stands have little flexibility in the range of their utility, which makes them appear economically unattractive in light of the comparatively high procurement costs they incur.

SUMMARY OF THE INVENTION

An objective of the present invention is to ensure flexible and inexpensive adaptability of a drive-train test stand, such that the drive-train test stand is suitable for testing motor vehicle drive-trains before they are fitted into a vehicle.

According to the invention this objective is achieved by the sub-assemblies for a drive unit. Advantageous design features emerge from the subordinate claims.

The invention relates to a sub-assembly for a drive unit. The sub-assembly, according to the invention, is characterized in that the sub-assembly comprises a standardized interface for connection to at least one other sub-assembly for the same drive unit.

This gives the advantage that sub-assemblies, according to the invention, can be combined with one another by way of the standardized interfaces in almost any desired manner. This, in turn, makes it possible for the drive unit made of sub-assemblies of various sizes to be adapted flexibly and according to need, to a motor vehicle drive-train that is to be tested. Thus, there is no need for a respective drive-train-specific, expensive and complex new design of drive units. Since the sub-assemblies, according to the invention, can also preferably be separated again from one another at their interfaces, if necessary individual sub-assemblies can also be taken off the drive unit and replaced by other sub-assemblies. Thus, the drive unit can also be quickly and flexibly adapted for the test requirements of another motor vehicle drive-train to be tested. This considerably reduces the time and costs required for producing a drive-train-adapted drive unit.

In the context of the invention, the term "standardized interface" is understood to mean an interface which is normalized—i.e., standardized—in such manner that it allows connection to all the possible elements or sub-assemblies which also have a corresponding standardized interface. The standardized interface can be in the form of a mechanical, electrical or hydraulic interface. For example, the standardized interface can be in the form of a flange connection with a standardized hole distribution, or as plug-socket connections that match one another. In principle, in this context any design of the interfaces of the sub-assemblies is conceivable, provided only that it is standardized in such manner that it enables connection to sub-assemblies also normalized or standardized in the same way.

The drive unit is preferably a drive unit for a drive-train test stand, such that the test stand is suitable for testing a motor vehicle drive-train outside a vehicle.

According to a preferred embodiment of the invention, it is provided that the sub-assembly is assigned to a functional class of sub-assemblies, wherein the sub-assemblies of a functional class fulfill identical functions but differ from one another at least in the maximum performance they can deliver, their mechanical load capacity, their dimensioning and/or their dynamic behavior. This has the advantage that to obtain a particular functionality from a functional class, variously dimensioned or designed sub-assemblies are available, each of which indeed provides the same functionality or fulfills the same function, but as regards their physical characteristics, are adapted to different requirements. Thus, to fulfill a desired function a sub-assembly adapted to the requirements of the case can always be called for. Thanks to the standardized interfaces, these sub-assemblies can be connected without problems to the other sub-assemblies, to form a drive unit. Furthermore, the sub-assemblies of a functional class can also differ in the operating comfort they provide and the time required to fit them.

Thus, by virtue of the numerous sub-assemblies that can be combined or connected with one another, a modular system is provided, which enables great flexibility in the composition of the drive unit from the sub-assemblies and, at the same time, by having recourse to already existing sub-assemblies, keeps the manufacturing costs low. In particular, no design effort and expenditure are entailed.

According to a further preferred embodiment of the invention, it is provided that the sub-assemblies are assigned to the functional classes: basic frames, consoles, adjusting devices, drive mechanisms, connection trains and swivel-plates. It has been shown that such functional classes provide the functions usually required. Thus, by a suitable selection and combination of sub-assemblies from the various functional classes, a drive unit can be produced, as necessary, which is suited to the needs of the case.

In a further preferred embodiment of the invention, it is provided that the sub-assemblies of the functional class of swivel-plates can pivot horizontally. This makes it possible for the drive unit or the sub-assemblies arranged on the swivel-plate to pivot horizontally in order to align the drive unit horizontally to fit a drive input shaft of the motor vehicle drive-train to be tested.

Particularly preferably, it is provided that the sub-assemblies of the swivel-plate functional class can be pivoted horizontally by means of a transmission motor. This facilitates the pivoting as such compared with purely manual pivoting, and, in particular, simplifies the achievement of a precise horizontal orientation.

According to a further preferred embodiment of the invention, it is provided that the inclination of the sub-assemblies of the functional class of basic frames can be adjusted. This enables the drive unit or the sub-assemblies arranged on the basic frame to be adjusted in their inclination relative to horizontal, in order to align the drive unit relative to a drive input shaft of the motor vehicle drive-train to be tested.

In this case too it is particularly preferred that the inclination of the sub-assemblies of the basic frames functional class can be adjusted by means of a transmission motor. This facilitates adjustment of the inclination relative to horizontal as such compared with purely manual adjustment, and in particular simplifies the achievement of precise alignment.

Preferably, it is provided that contact surfaces of the basic frames, along which the inclination adjustment takes place, are provided with plastic slipways. This favors force-efficient and precise adjustment of the inclination of the basic frame. A further advantage is the high system rigidity that results from the slipways for the basic frames and for the drive units. The occurrence of vibrations can thus largely be avoided.

The inclination adjustment can take place, for example, along inclination rails.

Particularly preferably, it is provided that the slipways are bonded to the contact surfaces by means of a two-component adhesive, and then milled flat. The milling ensures a particularly smooth and uniform surface which, in turn, still further favors force-efficient and precise inclination adjustment of the drive unit. Moreover, the rigidity of the joint is improved by the milling and the resultant additional smoothness.

In a further preferred embodiment of the invention, it is provided that the sub-assemblies of the functional class of consoles comprise means for longitudinal displacement. This advantageously makes it possible for the sub-assemblies arranged on the console to be displaced longitudinally in the direction of the drive input shaft of the motor vehicle drive-train to be tested, or to be moved longitudinally away from the drive input shaft of the motor vehicle drive-train to be tested. Thus, the drive unit can still be aligned longitudinally with the drive input shaft of the motor vehicle drive-train on the console when the structure of the connection train has been changed and the longitudinal length of the connection train has also consequently been changed.

Particularly preferably, it is provided that the longitudinal displacement of the consoles can be adjusted by means of a transmission motor. This facilitates the longitudinal adjustment of the drive unit or sub-assemblies arranged on the console and, in particular, simplifies the achievement of precise longitudinal alignment.

In another preferred embodiment of the invention, it is provided that the sub-assemblies of the functional class of connection trains comprise at least one of the elements torque-measurement device and/or intermediate mounting. This makes possible a structure of the connection train specifically adapted for the drive-train concerned and for the requirements of the case.

The torque-measurement device serves to determine torques that act upon the drive-train. This is advantageous in order to test the load-dependent behavior of the motor vehicle drive-train.

The intermediate mounting serves to support the rotational bearing of the connection train and thus to avoid the occurrence of vibrations in the connection train.

Preferably, it is provided that the sub-assemblies of the functional class of connection trains comprise at least one of the elements coupling flange and/or blocking means and/or safety clutch.

The coupling flange serves to couple the connection train of the drive unit to the drive input shaft of the motor vehicle drive-train to be tested, in a rotationally fixed manner.

The blocking means serve to block any rotation movement of the connection train. Thus for example, assembly, fitting or maintenance work on the drive unit can be performed and it is also possible to test the behavior of the motor vehicle drive-train to be tested when a drive input shaft of the motor vehicle drive-train is completely blocked. The blocking means can be additionally provided to a brake or alternatively to a brake.

The safety clutch serves to separate the connection train or drive unit from the drive input shaft of the motor vehicle drive-train in the event of overload, and thus to protect both the motor vehicle drive-train and also the drive unit against damage caused by overloading.

However, it is also possible and preferred, in the structure of a drive unit according to the invention, to dispense completely with sub-assemblies of the connection train functional class and, instead, to connect the drive unit directly to the drive input shaft of the motor vehicle drive-train. Since the connection in which a connection train is not used is very rigid, in that way highly dynamic measurements can also be carried out. For example, the drive unit can simulate the behavior and, in particular, the torque irregularities of a four-cylinder or six-cylinder internal combustion engine and transmit them directly to the motor vehicle drive-train.

According to a further preferred embodiment of the invention, it is provided that the sub-assemblies of the functional class of adjustment devices comprise at least one positioning cylinder and a guide-rail. The adjustment device enables adjustment of the drive unit in the sense of a displacement of the complete drive unit in the longitudinal or lateral direction, i.e., a translational movement. Thus for example, the drive unit can be aligned particularly simply with a drive input shaft of the motor vehicle drive-train to be tested. In this case, the positioning cylinder is the actor which applies the force needed for the movement or adjustment. The guide-rail guides the adjusted sub-assemblies along the direction determined by the guide-rail.

Preferably, it is provided that the adjustment device does not adjust the complete drive unit but only some of the sub-assemblies of the drive unit, for example, the drive-train and the drive input mechanism and the console.

Furthermore, it is preferred to provide the guide-rails and, in particular, also the surfaces of the drive output unit that come into direct contact with the guide-rails, with slipways made of plastic. This favors a force-efficient and precise adjustment of the drive unit.

Particularly preferably, it is provided that in this case too the slipways are adhesively bonded onto the guide-rails and the corresponding surfaces of the drive unit, and are then milled.

The positioning cylinder is preferably in the form of a hydraulic cylinder which brings about the adjustment movement of the drive unit or the corresponding sub-assemblies when acted upon by pressure fluid.

Alternatively preferred, the positioning cylinder is in the form of an electric cylinder which, by means of an electric motor acting upon a threaded spindle, brings about an adjustment movement of the drive unit or the corresponding sub-assemblies. Both the electric motor and the threaded spindle can, in this case, be accommodated in an outer casing of the electric cylinder, for example. However, the outer casing can also be omitted.

The guide-rail is preferably in the form of a T-groove.

Furthermore, it is preferably provided that the adjustment device comprises not just one positioning cylinder and one guide-rail, but two positioning cylinders and two guide-rails. In such a case, the two guide-rails are directed horizontally and perpendicularly to one another so that an adjustment is possible both in the longitudinal and also in the lateral direction. The two positioning cylinders are correspondingly orientated in order to displace the drive unit in the longitudinal and in the lateral direction along the two guide-rails.

In a further preferred embodiment of the invention, it is provided that the sub-assemblies of the functional class of drive mechanisms are in the form of synchronous motors. Synchronous motors have a comparatively high power density along with very good dynamic behavior.

The drive unit simulates the behavior of a drive aggregate for the motor vehicle drive-train, and the drive unit can preferably be brought indirectly into driving connection with a drive input shaft of the motor vehicle drive-train by way of the connection train. The drive unit enables a defined action to be imposed upon the motor vehicle drive-train with drive torques, in order to test the behavior of the motor vehicle drive-train under load.

Depending on the design of the drive unit, it can be air-cooled or water-cooled, or cooled by a combination of air and water.

The invention also relates to a drive unit for a motor vehicle drive-train, which comprises a number of sub-assemblies. The drive unit according to the invention is characterized in that the sub-assemblies are sub-assemblies according to the invention. This results in the advantages already described in connection with the sub-assemblies according to the invention, for the drive unit according to the invention as well.

According to a preferred embodiment of the invention, it is provided that the drive unit comprises not more than one sub-assembly from any one functional class. Since all the sub-assemblies of one and the same functional class fulfill an identical function, it is advantageously not necessary to have recourse to more than a single sub-assembly from each functional class.

Moreover, the invention relates to a drive-train test stand for testing a motor vehicle drive-train. The drive-train test stand according to the invention is characterized in that the drive-train test stand comprises a drive unit according to the invention. From this derive the advantages already described in connection with the drive unit according to the invention, for the drive-train test stand as well.

In the context of the invention, a drive-train is preferably understood to mean passenger car transmissions, truck transmissions, building site vehicle transmissions, bus transmissions and off-road vehicle transmissions, internal combustion engines, electric motors, axle systems, shaft systems and rotary fluctuation damping systems.

The drive-train test stand is preferably designed to test a motor vehicle drive-train not fitted in a vehicle.

Finally, the invention relates to a modular system for the simple production of a drive unit adapted according to requirements for a drive-train test stand, which comprises a number of functional classes of sub-assemblies, wherein the functional classes each contain a number of functionally identical but differently dimensioned sub-assemblies. The modular system, according to the invention, is characterized in that the drive unit is a drive unit according to the invention. Thus, the modules according to the invention make it possible in a simple, quick and inexpensive way to produce a drive unit suited to the requirements of the case for a drive-train test stand.

BRIEF DESCRIPTION OF THE DRAWINGS

Below, the invention is explained with reference to example embodiments illustrated in the figures, which show:

FIG. 5: An example of a possible embodiment of a swivel-plate, FIGS. 6a, 6b and 6c: Examples of three possible embodiments of an intermediate mounting, FIG. 7: An example of a torque measurement device, FIGS. 8a and 8b: Examples of two different embodiments of connection trains, and FIGS. 9a, 9b, 9c and 9d: Examples of various possible configurations of a drive-train test stand according to the invention.

DETAILED DESCRIPTION OF THE PREFERRED EMBODIMENTS

The same objects, functional units and comparable components are denoted by the same indexes in all the figures. As regards their technical characteristics these objects, functional units and comparable components are identically designed unless otherwise indicated explicitly or implicitly from the description.

Figure 1:
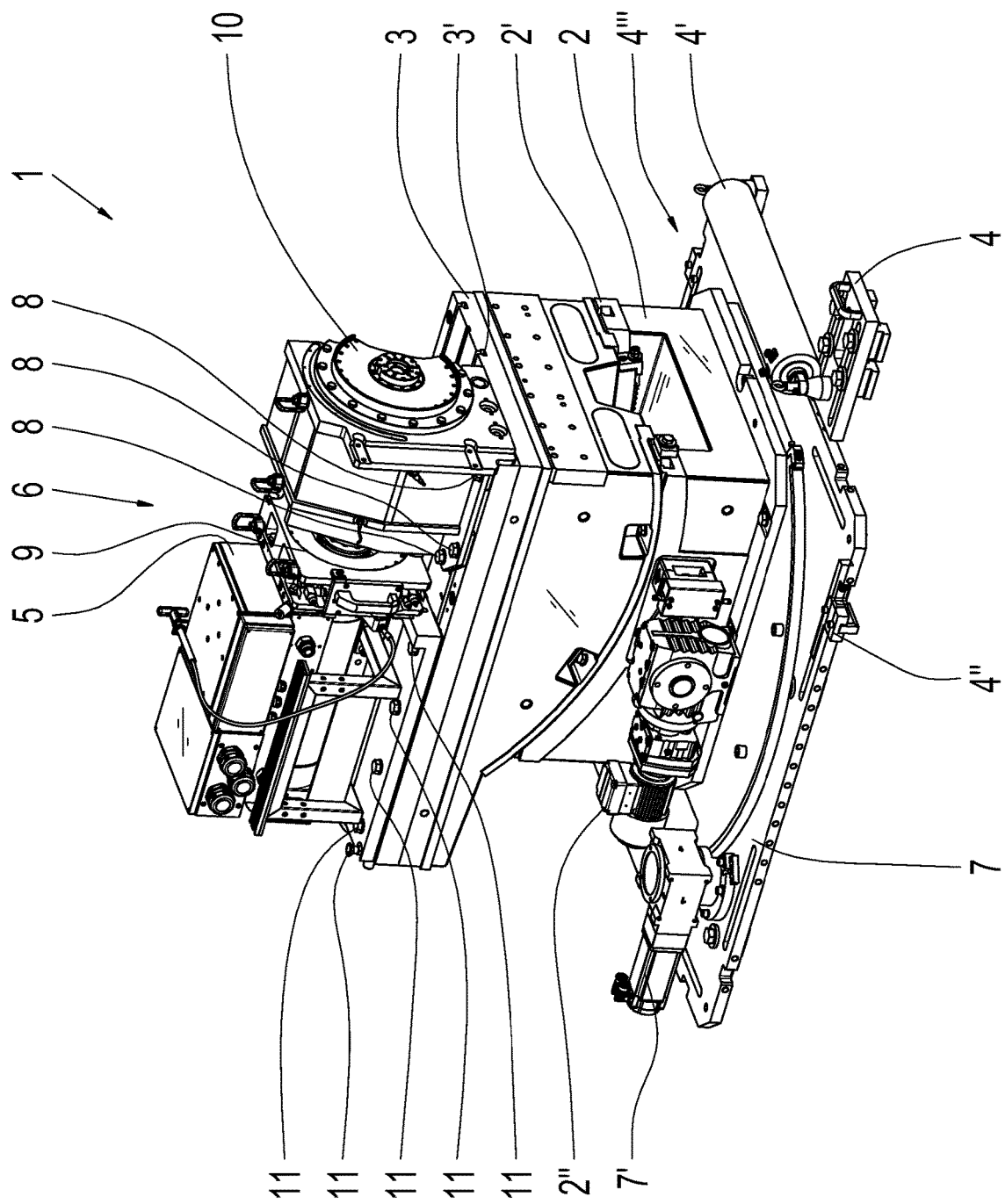
FIG. 1: An example of a possible structure of a drive unit according to the invention.

FIG. 1 shows an example of a possible structure of a drive unit 1 for a drive-train test stand (not shown in FIG. 1). The drive unit 1 comprises a number of sub-assemblies 2, 3, 4, 5, 6, 7, wherein the sub-assemblies 2, 3, 4, 5, 6, 7 each comprise a standardized interface for mechanical, electrical or hydraulic connection to a further sub-assembly 2, 3, 4, 5, 6, 7 of the drive unit 1. Here, the standardized interface enables almost any desired combination of sub-assemblies 2, 3, 4, 5, 7 to form a drive unit 1. Thus, a respective requirement-orientated and drive-train-specifically adapted drive unit 1 can be produced from a modular system comprising the sub-assemblies 2, 3, 4, 5, 6, 7. For example, the shown drive unit 1 comprises a basic frame 2, a console 3, an adjustment device 4, a drive mechanism 5, a connection train 6 and a swivel-plate 7. In this case the basic frame 2 is designed such that its inclination can be adjusted along an inclination rail 2'. For example, the desired inclination is adjusted by means of a transmission motor 2" associated with the basic frame 2. This inclination adjustability of the basic frame 2 allows adaptation of the inclination of the sub-assemblies 3, 5, 6 arranged on the basic frame 2 to a drive input shaft of a motor vehicle drive-train to be tested. In this example, the console 3 is mechanically connected to the basic frame 2 by a screw connection in the form of a standardized interface (not shown in FIG. 1). The console 3 comprises longitudinal adjustment means, only indicated in the representation shown in FIG. 1, which make it possible to displace longitudinally the sub-assemblies 5, 6 arranged on the console 3 in the direction of the drive input shaft of the motor vehicle drive-train to be tested. Thus, the drive mechanism 5 on the console 3 can still be located longitudinally on the drive input shaft of the motor vehicle drive-train, even if the structure of the connection train 6 has been changed with the result that the longitudinal length of the connection train 6 has also changed. For example, the longitudinal adjustment means 15 of the console 3 are designed as a manual longitudinal adjustment, which allows manual displacement in the longitudinal direction after corresponding mechanical fixing devices have been undone. The drive mechanism 5 is connected to the console 3 by way of standardized screw connections 11 and a standardized guide-rail 3' of the console, forming a standardized interface. In addition, the drive mechanism 5 is connected in a rotationally fixed manner to a connection train 6. In turn, the connection train 6 can be rotationally fixedly connected to a drive input shaft of a motor vehicle drive-train to be tested. In addition, in the present example, the connection train 6 is connected mechanically to the console 3 by standardized screw connections 8 that form a standardized interface. The connection train 6, shown in FIG. 1, comprises the elements of a torque measurement device 9 and an intermediate mounting 10.

As can also be seen, the subassemblies basic frame 2, console 3, drive mechanism 5 and connection train 6 are arranged on the swivel-plate 7, which is designed to pivot horizontally. This enables the drive unit 1, or the sub-assemblies 2, 3, 5, 6 arranged on the swivel-plate 7, to be pivoted horizontally in order to align horizontally the drive unit 1 with a drive input shaft of the motor vehicle drive-train to be tested. For this, the swivel-plate 7 also comprises a transmission motor 7' associated with the swivel-plate, which simplifies the precise adjustment of the horizontal orientation of the drive unit 1. In this example, the adjustment device 4 comprises an electric cylinder 4' and guide-rails 4", 4''', each of the latter having a T-groove. In the example, the electric cylinder 4' comprises a threaded spindle (not shown) and an electric motor (also not shown) that acts upon the threaded spindle. By actuating the electric cylinder 4', the drive unit 1 is moved laterally along the guide-rails 4", 4'''. In the example the drive unit 1 can only be moved longitudinally when the electric cylinder 4' is refitted from its lateral displacement position to a longitudinal displacement position. Owing to the modular structure of the drive unit 1, and, in particular owing to the standardized interfaces, this can be done in a comparatively simple manner. In addition, a longitudinal displacement is possible by moving the console 3 longitudinally. By having recourse to sub-assemblies 2, 3, 4, 5, 6, 7 in each case with standardized interfaces of the modular system according to the invention, the drive unit 1 illustrated can be built up and adapted in almost any desired manner and for the most varied power requirements using differently dimensioned sub-assemblies 2, 3, 4, 5, 6, 7.

Figure 2A:
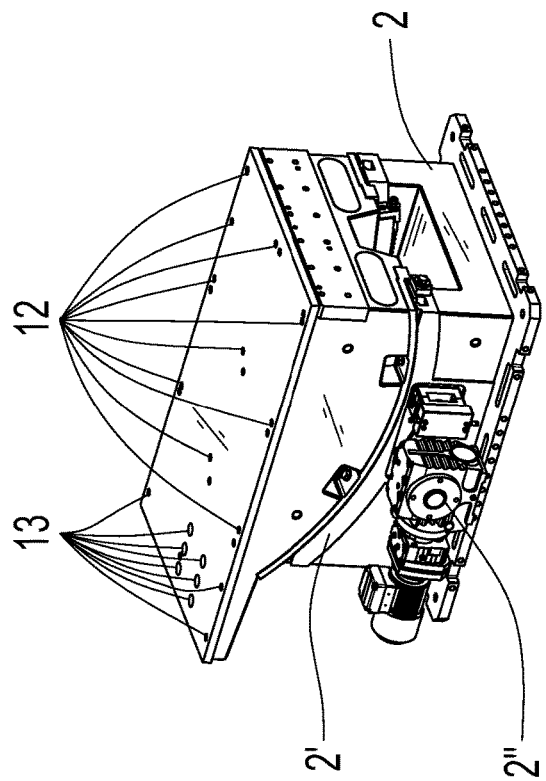
FIGS. 2a, 2b and 2c: Examples of three different embodiments of basic frames.
Figure 2B:
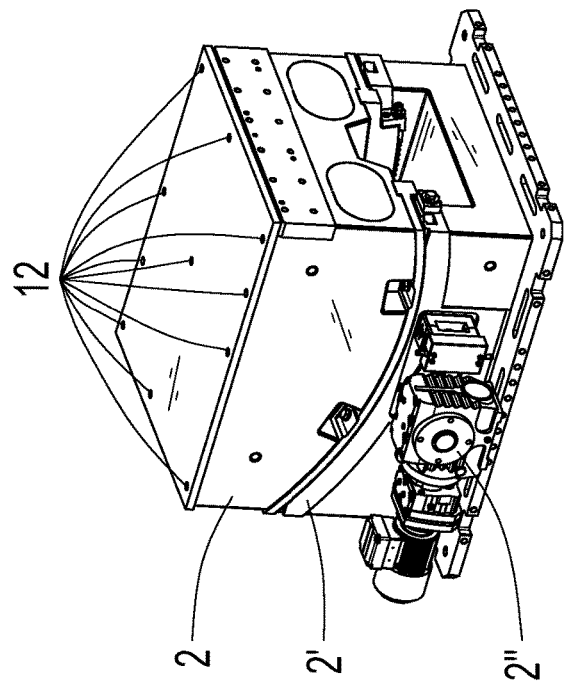
Figure 2C:
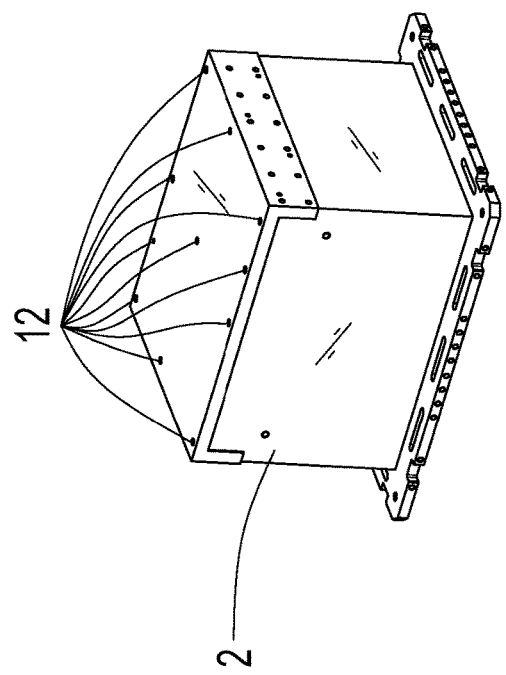

FIG. 2 shows examples of three different embodiment of basic frames 2. The inclination of the basic frame 2 in FIG. 2a can be adjusted along the inclination rails 2' by means of the transmission motor 2" associated with the basic frame 2. The basic frame 2 has a number of holes 12 formed, on its upper side, at precisely defined positions, which constitute a standardized interface for connection to a console 3. The basic frame in FIG. 2b, however, has a longitudinally extended upper side in which additional holes 13 are formed. Due to the comparatively longer upper side and the additional holes 13, the basic frame 2 of FIG. 2b can be connected to a comparatively longitudinally longer console 3 which, in turn, enables the fitting of comparatively longitudinally longer connection trains 6 onto the console 3. Yet, even with a comparatively longitudinally longer console 3, the drive mechanism can be moved correspondingly farther toward the longitudinal end so that a comparatively shorter connection train 6 can again be used or, if appropriate, a connection train 6 can be omitted completely. FIG. 2c shows a comparatively simple embodiment of a basic frame 2 without the possibility of inclination adjustment. Nevertheless, the basic frame 2 of FIG. 2c still has the holes 12 and, therefore, the standardized interface.

Figure 3B:
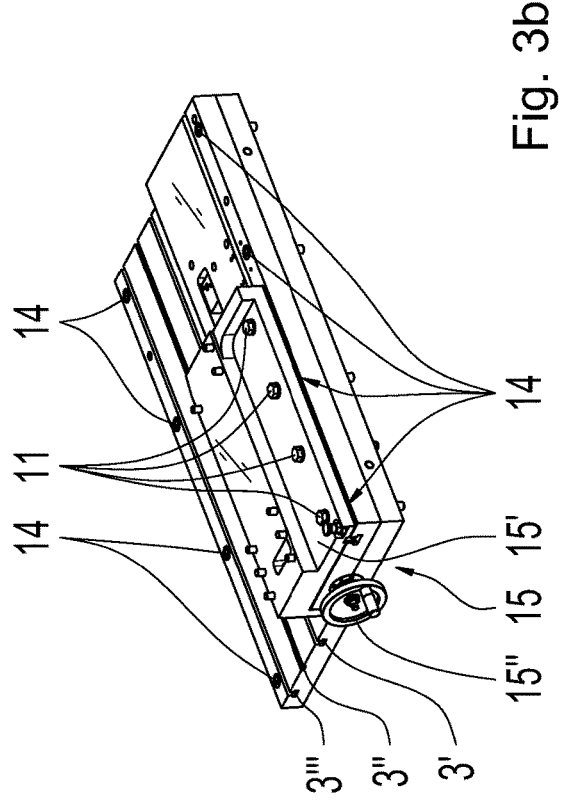
FIGS. 3a and 3b: Examples of two different embodiments of consoles.
Figure 3A:
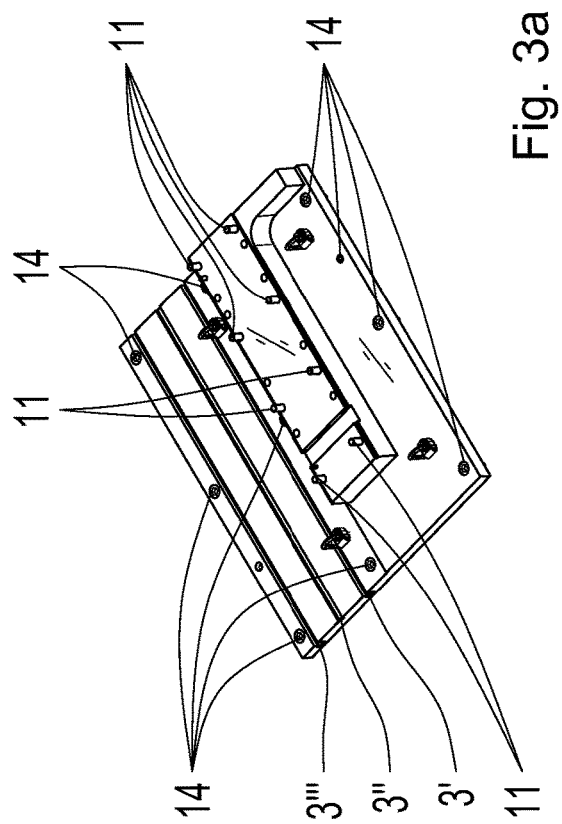

FIG. 3 shows examples of two different embodiments of consoles 3. The console 3 in FIG. 3a has standardized screw connections 14 forming a standardized interface with the basic frame 2. By virtue of the screw connections 11 and guide-rails integrated in the console 3 (not shown in FIG. 3a), a drive mechanism 5 can also be connected to the console 3. No longitudinal adjustment means 15 of the console 3 in FIG. 3a are provided. The console 3 in FIG. 3b also has standardized screw connections 14 as a standardized interface with the basic frame 2. The console 3 in FIG. 3b too, can be connected to a drive mechanism 5 by the screw connections 11 and by guide-rails (not shown in FIG. 3). In addition, the console 3 shown in FIG. 3b has longitudinal adjustment means 15 that consist of a displacement sled 15' and a hand crank 15". By manually operating the hand crank 15" the displacement sled 15' can be moved back and forth in the longitudinal direction.

Figure 4B:
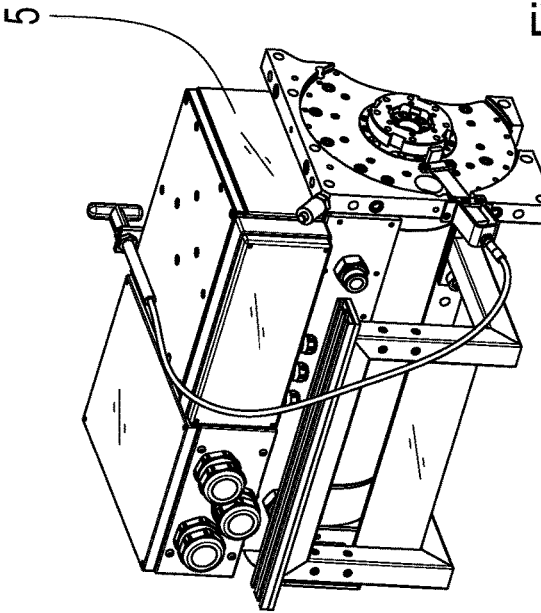
FIGS. 4a and 4b: Examples of two differently dimensioned drive units.
Figure 4A:
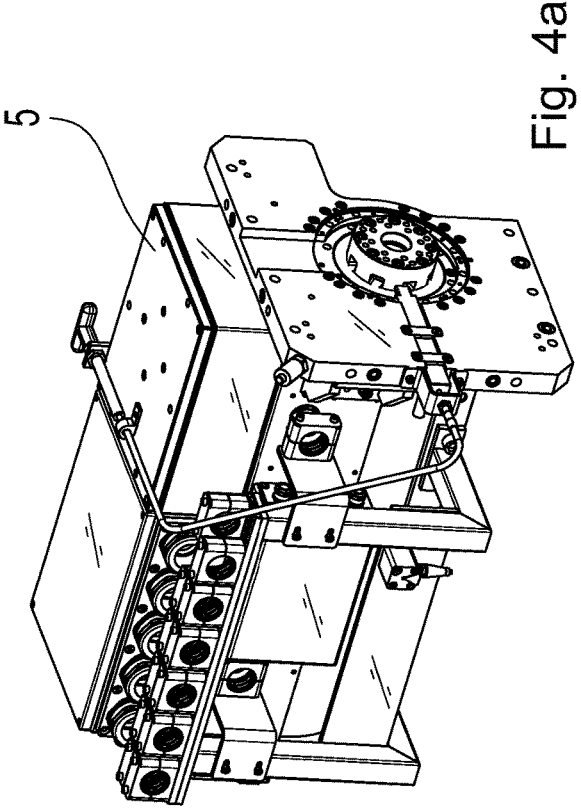

FIG. 4 shows as examples two differently dimensioned drive mechanisms 5, which are in the form of synchronous motors. The drive mechanisms 5 in FIGS. 4a and 4b differ in their geometrical dimensions and their powers.

FIG. 5 shows as an example a possible embodiment of a swivel-plate 7. The swivel-plate 7 comprises a pivoting plate 7", a swivel bearing 7''' and a transmission motor 7' associated with the pivoting plate 7", which engages by way of a gearwheel (not shown) in a rack-bar (also not shown), a chain, or some other suitable counterpart of the pivoting plate 7" in order to pivot it about the swivel bearing 7'". Since the transmission motor 7' can pivot the pivoting plate 7" around the swivel bearing 7'", it also pivots the sub-assemblies arranged on the swivel-plate 7 or on the pivoting plate 7". By means of the holes 17 that form a standardized interface the swivel-plate 7 can be connected to a basic frame 2.

FIG. 6 shows three possible embodiments of an intermediate mounting 10. The intermediate mounting 10 in FIG. 6a has a rotatable connecting flange 10' for coupling to a drive input shaft of a motor vehicle drive-train. By virtue of the screw connections 16 forming a standardized interface, the intermediate mounting 10 can also be connected to a console 3. Compared with the intermediate mounting 10 in FIG. 6a, the intermediate mounting 10 shown in FIG. 6b additionally comprises a rapid-tightening system 10", which enables the simple and, in particular, quick connection of the intermediate mounting 10 to a housing connector of the motor vehicle drive-train to be tested. In this way, in particular the assembly and fitting times for fitting and removing the motor vehicle drive-train to be tested onto or from a drive-train test stand, according to the invention, are reduced. The intermediate mounting 10 in FIG. 6c, compared with the intermediate mountings of FIGS. 6a and 6b, has in addition a rotatable disk 10'" with a cut-out. The said cut-out serves to provide, in this case, space for a drive output shaft of a transmission of a motor vehicle drive-train to be tested. Since the disk 10'" can rotate and correspondingly the orientation of the cut-out can also be changed, a vehicle transmission coupled to the intermediate mounting 10 can be tilted. This tilting of the vehicle transmission leads to a changed orientation of the oil sump in the vehicle transmission and serves to simulate uphill and downhill driving.

FIG. 7 shows an example of a torque measurement device 9 for a connection train 6. The torque measurement device 9 has an outer housing 9' and torque uptake means 9" in the form of a flange. Since the torque measurement device 9 is integrated in the connection train 6 and the torque generated by the drive mechanism 5 passes through the torque uptake means 9", the torque can be detected and determined. At the same time, the rotation speed can be detected and determined. In this case, the rotation speed and torque are read out with no contact by means of an antenna comprised in the torque measurement device 9 (not shown in FIG. 7). Since the example torque measurement device 9 shown in FIG. 7 has a housing 9', it can advantageously be connected, on its torque input side, to the drive mechanism 5 and, on its torque output side, to the motor vehicle drive-train to be tested so forming a very much shorter and correspondingly more rigid connection train 6. In this case, namely, the housing 9' contributes substantially toward the avoidance or damping of vibrations in the connection train 6 thanks to its connection to the console 3. Thus, there is no need for a separate intermediate mounting. Such a shortened and more rigid structure of the connection train 6 makes it possible to simulate, for example, torque irregularities produced by an internal combustion engine.

FIG. 8 shows as examples two different embodiments of connection trains 6. The connection train 6 in FIG. 8a, in this example, comprises a flange connection 18 for connecting the connection train 6 to a drive input shaft of a motor vehicle drive-train to be tested, and a standardized interface also in the form of a flange connection 19 for a torque detection device 9, as illustrated for example in FIG. 7. The connection train 6, in FIG. 8b, differs from the connection train 6 in FIG. 8a in that a torque detection device 9 is present. The torque detection device 9, shown in FIG. 8b, comprises an antenna base 9'", which makes it possible to read out measurements without contact. Compared with the torque measurement device 9 in FIG. 7, the torque measurement device 9 in FIG. 8b is comparatively compact and inexpensive. In this example, however, it is not suitable for the detection of torques and rotation speeds as high as those that can be detected by the torque detection device 9 of FIG. 7.

FIG. 9 shows as examples various possible configurations of a drive-train test stand 20 according to the invention for testing a motor vehicle drive-train 21 consisting of a transmission 24 and an axle drive output shaft 23. The drive-train test stand 20 in FIG. 9a consists of a drive unit 1 according to the invention and a drive output unit 22. In drive connection between the drive unit 1 and the drive output unit 22 is arranged the motor vehicle drive-train 21 to be tested. By way of the axle drive output shaft 23, the transmission 24 is connected to the drive output unit 22. The drive unit 21 produces a drive torque and passes it on to the motor vehicle drive-train 21. The transmission 24 converts the drive torque and passes it on via the axle drive output shaft 23 to the drive output unit 22. In the case of FIG. 9a, the drive output unit 22 simulates a driven axle.

FIG. 9b shows the drive-train test stand 20 in a configuration having two drive output units 22, 22'. In this case each of the drive output units 22, 22' simulates a driven wheel. The drive output units 22, 22' are connected to the motor vehicle drive-train 21 by way of the wheel drive output shafts 23', 23".

Figure 9D:
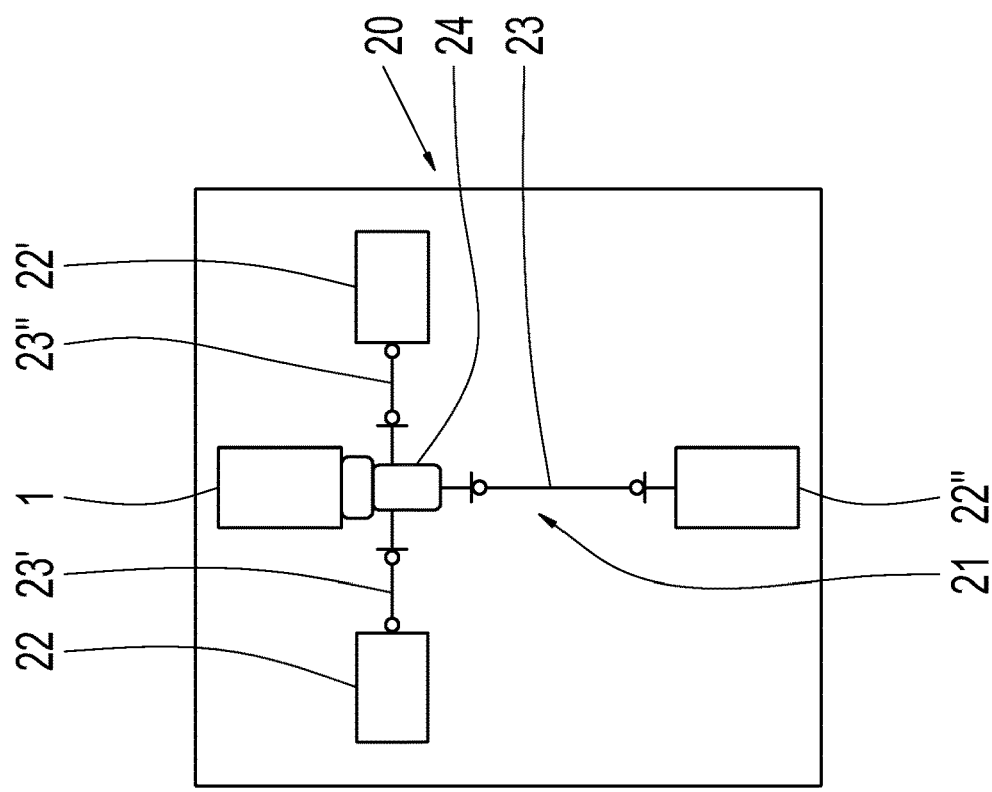
Figure 9C:
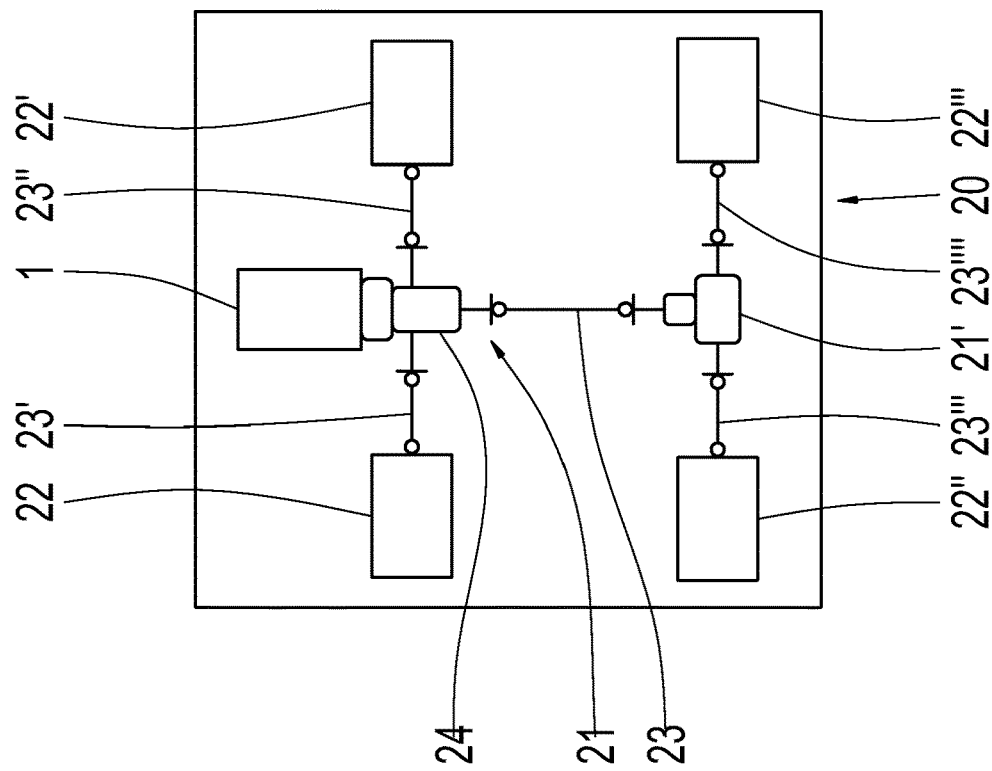

FIG. 9c shows the drive-train test stand 20 in a further configuration. In FIG. 9c, the drive-train test stand 20 comprises the drive unit 1, according to the invention, and four drive output units 22, 22', 22", 22'". A motor vehicle drive-train 21 to be tested comprises the transmission 24, the differential transmission 21', the axle drive output shaft 23 and the wheel drive output shafts 23', 23", 23'" and 23"" The drive output units 22, 22', 22", 22'", in each case, simulate a driven wheel. From the differential transmission 21', the distributed and converted torque is passed on, via the wheel drive output shafts 23'" and 23"", to the drive output units 22" and 22'" Likewise, the distributed and converted torque is passed on to the drive output units 22 and 22', via the wheel drive output shafts 23' and 23".

FIG. 9d shows the drive-train test stand 20 in yet another configuration. In FIG. 9d, the motor vehicle drive-train 21 to be tested is driven by the drive unit 1. The transmission 24 converts the torque and distributes it, via the wheel drive output shafts 23' and 23", to the drive output units 22 and 22'. The drive output units 22 and 22' each simulate a driven wheel. Furthermore, the transmission 24 also passes on the converted torque, via the axle drive output shaft 23, to the drive output unit 22", which simulates a driven axle.

In a further example embodiment (not shown), the drive-train test stands 20 of FIG. 9 have a so-termed elastic structure, which corresponds to a suspension of the motor vehicle drive-train 20 to be tested in the vehicle in the original. Such an embodiment of the drive-train test stand 20, according to the invention, enables a realistic analysis of the vibration behavior and, in particular, the acoustic behavior, for example during a shifting process.

INDEXES

1 Drive unit
2 Basic frame

2' inclination rail
2" Transmission motor
3 Console
4 Adjustment device
4' Hydraulic cylinder
4", 4'" Guide-rail
5 Drive input mechanism
6 Connection train
7 Swivel-plate
7' Transmission motor
7" Pivoting plate
7'" Swivel bearing
8 Screw connection
9 Torque measurement device
9' Housing
9" Torque uptake means
9'" Base
10 Intermediate mounting
10' Connection flange
10" Rapid-tightening system
10'" Disk
11 Screw connection
12 Hole
13 Additional hole
14 Screw connection
15 Longitudinal adjustment means
15' Adjustment sled
15" Hand crank
16 Screw connection
17 Holes
19 Flange connection
20 Drive-train test stand
21 Motor vehicle drive-train
21' Differential transmission
22, 22', 22", 22'" Drive output unit
23, 23', 23",
23'", 23"" Drive output shaft
24 Transmission

The invention claimed is:

1. A plurality of sub-assemblies for a drive unit (1) for a drive-train test stand which are adjustable to adapt the drive unit for connection to a drive input shaft of a motor vehicle drive-train to be tested,
wherein at least one of the plurality of sub-assemblies is adjustable, relative to the drive-train test stand, to facilitate connection of the drive unit to a drive input shaft of a drive-train to be tested,
each one of the plurality of sub-assemblies comprises at least one standardized interface such that each one of the plurality of sub-assemblies is connectable, via its at least one standard interface, to the at least one standard interface of another one of the plurality of sub-assemblies to form the drive unit;
the drive unit is connectable, via the at least one standard interface of one of the plurality of sub-assemblies, to the drive-train test stand;
at least one of the sub-assemblies being adjustable, relative to the drive-train test stand, to alter a position of a remainder of the drive unit and facilitate engagement with the drive input shaft of the drive-train to be tested; and
the plurality of sub-assemblies are selected from different functional groups of sub-assemblies such that each of the plurality of sub-assemblies has a distinct function.

2. The plurality of sub-assemblies according to claim 1, wherein at least one of the plurality of sub-assemblies is swivelable horizontally relative to the drive input shaft of the drive-train to be tested to facilitate engagement therewith.

3. The plurality of sub-assemblies according to claim 1, wherein each one of the plurality of sub-assemblies belongs to one of a variety of different functional classes for performing a desired function, and
sub-assemblies which belong to the same functional class are interchangeable with one another and perform the same function but have at least one of different:
drive outputs,
mechanical load capacities,
dimensions, and
dynamic behaviors.

4. The plurality of sub-assemblies according to claim 3, wherein the plurality of sub-assemblies comprise a basic frame, a console, an adjustment device, a drive mechanism, a connection train (6), and a swivel-plate.

5. The plurality of sub-assemblies according to claim 4, wherein at least one of the plurality of the sub-assemblies is a basic frame that facilitates adjustment of an inclination angle of the drive unit relative to the drive input shaft of the drive-train to be tested.

6. The plurality of sub-assemblies according to claim 4, wherein at least one of the plurality of sub-assemblies is a console that has a longitudinal adjustment mechanism to adjust the drive unit longitudinally relative to the drive input shaft of the drive-train to be tested.

7. The plurality of sub-assemblies according to claim 4, wherein at least one of the plurality of sub-assemblies is a connection train which comprises at least one of a torque measurement device and an intermediate mounting.

8. The plurality of sub-assemblies according to claim 4, wherein at least one of the plurality of sub-assemblies is an adjustment device (4) that comprises at least one positioning cylinder and a guide-rail.

9. The plurality of sub-assemblies according to claim 4, wherein at least one of the plurality of sub-assemblies is a drive mechanism formed as a synchronous motor.

10. A drive unit for a drive-train test stand for testing a motor vehicle drive-train, comprising a plurality of sub-assemblies,
wherein the plurality of sub-assemblies comprise first, second, third, fourth, fifth and sixth sub-assemblies, and at least three of the first, second, third, fourth, fifth and sixth sub-assemblies are adjustable, relative to the drive-train test stand, to facilitate connection of the drive unit to a drive input shaft of a drive-train to be tested,
each of the first, the second, the third, the fourth, the fifth and the sixth sub-assemblies have a standard interface such that the first, the second, the third, the fourth, the fifth and the sixth sub-assemblies are connectable, via their respective standard interfaces, to the standard interface of at least one other of the plurality of sub-assemblies or the drive-train test stand,
the drive unit is connectable, via the at least one standard interface of one of the plurality of sub-assemblies to the drive-train test stand,
at least one of the first, the second, the third, the fourth, the fifth and the sixth sub-assemblies being adjustable, relative to the drive-train test stand, to alter a position of a remainder of the drive unit and facilitate engagement with the drive input shaft of the drive-train to be tested, and the first, the second, the third, the fourth, the fifth and the sixth sub-assemblies are selected from first, second, third, fourth, fifth and sixth functional groups of sub-assemblies, respectively, such that each of the first, the second, the third, the fourth, the fifth and the sixth sub-assemblies has a distinct function.

11. The drive unit according to claim 10, wherein the drive unit comprises only a single sub-assembly from each one of the first, the second, the third, the fourth, the fifth and the sixth functional groups.

12. The drive-train test stand for testing the motor vehicle drive-train, wherein the drive-train test stand comprises the drive unit according to claim 10.

13. A modular system for a simple production of a requirement-adapted drive unit for a drive-train test stand, the modular system comprising:

a plurality of functional groups of sub-assemblies such that each functional group comprises a unique function,
wherein the drive unit is formed by only one sub-assembly from each one of the plurality of functional groups of sub-assemblies,
at least one of the sub-assemblies that form the drive unit is adjustable, relative to the drive-train test stand, to alter a position of a remainder of the drive unit relative to a drive input shaft of a drive-train to be tested, and
the sub-assemblies of each of the plurality of functional groups of the sub-assemblies have at least one standard interface such that each one of the plurality of sub-assemblies is connectable, via its at least one standard interface, to the at least one standard interface of another one of the plurality of sub-assemblies to form the drive unit.

* * * * *